United States Patent
Muir et al.

(10) Patent No.: US 9,956,842 B2
(45) Date of Patent: May 1, 2018

(54) SYSTEM AND METHOD FOR CONTROLLING STABILITY OF MILLING MACHINES

(71) Applicant: Caterpillar Paving Products Inc., Brooklyn Park, MN (US)

(72) Inventors: Jason W. Muir, Andover, MN (US); Timothy M. O'Donnell, Long Lake, MN (US); Dario Sansone, Castello d'Argile (IT)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 186 days.

(21) Appl. No.: 14/881,621

(22) Filed: Oct. 13, 2015

(65) Prior Publication Data
US 2017/0100981 A1 Apr. 13, 2017

(51) Int. Cl.
| E01C 23/088 | (2006.01) |
| B60G 17/019 | (2006.01) |
| E01C 23/12 | (2006.01) |
| B60G 17/0165 | (2006.01) |

(52) U.S. Cl.
CPC ... *B60G 17/01908* (2013.01); *B60G 17/0165* (2013.01); *E01C 23/088* (2013.01); *E01C 23/127* (2013.01); *B60G 2400/0511* (2013.01); *B60G 2400/0512* (2013.01); *B60G 2400/0521* (2013.01); *B60G 2400/82* (2013.01)

(58) Field of Classification Search
CPC .............................. E01C 23/088; E01C 23/127
See application file for complete search history.

(56) References Cited

U.S. PATENT DOCUMENTS

| 3,846,781 | A | | 11/1974 | Smith | |
| 4,943,119 | A | * | 7/1990 | Zarniko | E01C 19/006 181/123 |
| 5,378,081 | A | * | 1/1995 | Swisher, Jr. | E01C 23/088 299/39.5 |
| 5,736,939 | A | | 4/1998 | Corcoran | |
| 6,152,648 | A | * | 11/2000 | Gfroerer | E01C 23/088 299/1.5 |
| 6,769,836 | B2 | * | 8/2004 | Lloyd | E01C 23/065 404/75 |
| 7,430,468 | B2 | | 9/2008 | Salib et al. | |
| 7,640,081 | B2 | | 12/2009 | Lu et al. | |
| 7,770,909 | B2 | | 8/2010 | Anderson et al. | |
| 8,565,982 | B2 | | 10/2013 | Liifstrand | |
| 8,655,577 | B2 | * | 2/2014 | Stender | B60G 17/0155 701/1 |
| 8,818,699 | B2 | | 8/2014 | Nichols et al. | |
| 8,874,325 | B2 | * | 10/2014 | Killion | E01C 23/088 701/50 |
| 2007/0098494 | A1 | * | 5/2007 | Mares | E01C 23/088 404/75 |
| 2009/0108663 | A1 | * | 4/2009 | Berning | E01C 23/088 299/1.5 |
| 2012/0301220 | A1 | * | 11/2012 | Snoeck | E01C 23/088 404/75 |
| 2014/0336883 | A1 | | 11/2014 | Thompson et al. | |

* cited by examiner

Primary Examiner — John J Kreck

(57) ABSTRACT

A system for controlling a stability of a milling machine is disclosed. The system includes a frame having a first slope and a leg coupled to the frame. The leg extends and retracts along a length thereof with respect to the frame. The system includes a controller to determine the first slope and to actuate the leg if the first slope is greater than a first predetermined slope.

20 Claims, 5 Drawing Sheets

SYSTEM AND METHOD FOR CONTROLLING STABILITY OF MILLING MACHINES

TECHNICAL FIELD

The present disclosure relates to a system and a method for controlling stability of a milling machine.

BACKGROUND

Milling machines, such as cold planers and rotary mixers are used for performing various earth moving operations, such as removal of material from a work surface, and mixing or reclaiming material from the work surface. The milling machine includes multiple ground engaging members for movement over the work surface. Each of the ground engaging members is coupled to a frame of the milling machine by a leg. The leg is hydraulically actuated to raise or lower the frame with reference to the work surface. The milling machine further includes a rotor supported on the frame to contact with the work surface and perform the earth moving operations. During milling operation, travel along the work surface or standstill condition of the milling machine, the milling machine may incline based on a terrain of the work surface. If a slope of the milling machine exceeds beyond a desirable slope limit, then the milling machine may lose stability due to high center of gravity.

U.S. Pat. No. 8,818,699 (the '699 patent) discloses a weight-based stability detection system. The stability detection system is provided for detecting the stability of an articulated vehicle. The stability detection system includes a weigh system for measuring the weight distribution of the vehicle. A controller may provide a warning when the detected weight distribution exceeds a threshold. In the '699 patent, stability of the articulated vehicle is detected and a warning to an operator is provided, however, the '699 patent does not disclose controlling of the stability of the vehicle based on the measured weight distribution.

SUMMARY OF THE DISCLOSURE

In one aspect of the present disclosure, a system for controlling a stability of a milling machine is provided. The system includes a frame having a first slope and a leg coupled to the frame. The leg extends and retracts along a length thereof. The system includes a controller configured to determine the first slope and to actuate the leg if the first slope is greater than or equal to the first predetermined slope.

In another aspect of the present disclosure, a milling machine is provided. The milling machine includes a frame, a rotor coupled to the frame, a first vertically adjustable leg, a second vertically adjustable leg, and a fourth vertically adjustable leg. The milling machine further includes a controller configured to determine the first slope and to actuate an actuatable leg when the stability measurement is greater than or equal to a predetermined stability measurement. The actuatable leg is at least one of the first vertically adjustable leg, the second vertically adjustable leg, the third vertically adjustable leg, and the fourth vertically adjustable leg.

In yet another aspect of the present disclosure, a method of controlling a stability of a milling machine is provided. The method includes moving a ground engaging member of the milling machine over a ground surface. The ground engaging member is coupled to a frame of the milling machine by a leg. The method further includes determining a first slope of the frame and actuating the leg if the first slope is greater than or equal to the first predetermined slope.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
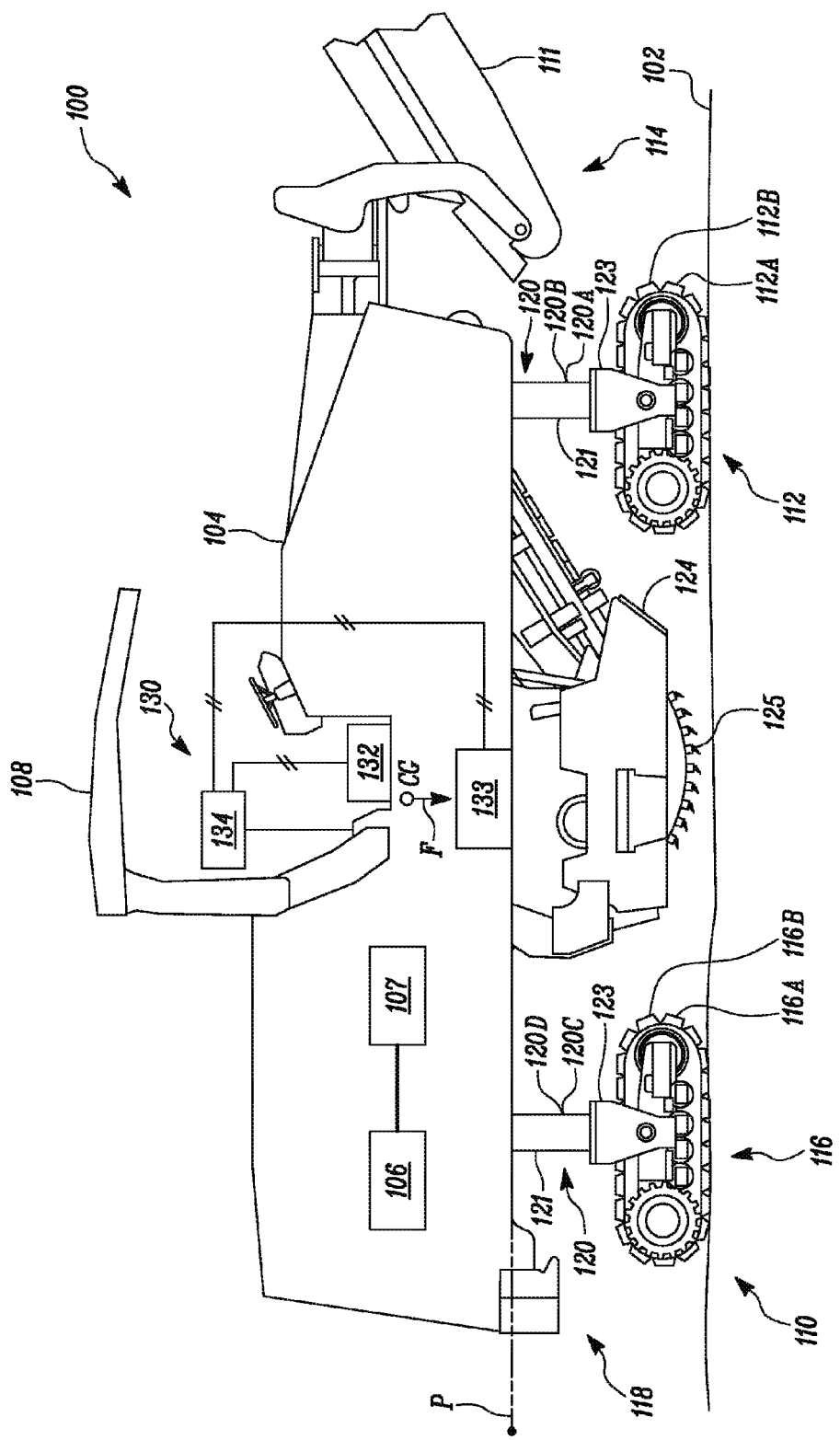
FIG. 1 is a side view of an exemplary milling machine.

FIG. 1 illustrates a side view of an exemplary milling machine 100 used for performing various earth moving operations, such as milling of a ground surface 102. The milling machine 100, such as a cold planer is illustrated in FIG. 1 for the purposes of present disclosure. However, the milling machine 100 may also be a rotary mixer or soil stabilizer. The milling machine 100 may be used for removing material from the ground surface 102. Further, the milling machine 100 may be used for reclaiming and/or mixing of material from a surface of a road way or any other work surfaces.

The milling machine 100 includes a frame 104 to support various components of the milling machine 100, such as an engine 106 and an operator cab 108. The engine 106 provides power to propel the milling machine 100 over the ground surface 102. The milling machine 100 further includes a hydraulic system 107 operably communicated with the engine 106. The hydraulic system 107 is configured to drive a ground engaging member 110 of the milling machine 100. The hydraulic system 107 is further configured to drive various other systems of the milling machine 100, such as a steering system and a conveyor system 111 of the milling machine 100. The conveyor system 111 is used for transporting the material removed from the ground surface 102 to a truck. The operator cab 108 may include a control console having various operating control levers, switches, and the like for controlling travel and milling operation of the milling machine 100.

The ground engaging member 110 is coupled to the frame 104 and engages with the ground surface 102 to move the milling machine 100 over the ground surface 102. In the illustrated embodiment, the milling machine 100 includes a first set of ground engaging members 112 disposed adjacent to a front end 114 of the milling machine 100. The first set of ground engaging members 112 includes a first ground engaging member 112A and a second ground engaging member 112B. The milling machine 100 further includes a second set of ground engaging members 116 disposed adjacent to a rear end 118 of the milling machine 100. The second set of ground engaging members 116 includes a third ground engaging member 116A and a fourth ground engaging member 116B (shown in FIG. 2). The first and second set of ground engaging members 112, 116 is tracks. In other embodiments, the first and second set of ground engaging members 112, 116 may be wheels.

In an embodiment, the first, second, third and fourth ground engaging members 112A, 112B, 116A, 116B are coupled to the frame 104 by multiple vertically adjustable legs 120. The first ground engaging member 112A is coupled to the frame 104 by a first leg 120A. Similarly, the second, third and fourth ground engaging members 112B, 116A, 116B are coupled to the frame 104 by a second leg 120B, a third leg 120C and a fourth leg 120D, respectively. Each of the first leg 120A, the second leg 120B, the third leg 120C and the fourth leg 120D extends and retracts along a length thereof to adjust the height of the frame 104 relative to the ground surface 102. The vertically adjustable legs 120 may raise or lower individually or collectively. The first leg 120A is described in detail below.

In an example, the first leg 120A may include a cylinder body (not shown) mounted on the frame 104 and a piston body 121 may be slidably disposed within the cylinder body. The cylinder body may be fluidly communicated with the hydraulic system 107. The piston body 121 may be moved between an extended position and a retracted position upon actuation of the hydraulic system 107. A maximum value of the length of the first leg 120A may be defined by the extended position of the piston body 121. Similarly, a minimum value of the length of the first leg 120A may be defined by the retracted position of the piston body 121. The extended position of the piston body 121 may correspond to lifting of the frame 104 and the retracted position of the piston body 121 may correspond to lowering of the frame 104. The piston body 121 may be further coupled to a mounting member 123 for supporting the first ground engaging member 112A. The mounting member 123 may operatively couple the first ground engaging member 112A.

The ground engaging members 110 may include a hydraulic drive motor (not shown) communicated with the hydraulic system 107. Upon actuation of the hydraulic system 107, the hydraulic drive motor may drive a track link that is in contact with the ground surface 102. Similarly, the second, third and fourth ground engaging members 112B, 116A, 116B and the second, third and fourth legs 120B, 120C, 120D may be communicated with the hydraulic system 107 to move the milling machine 100 over the ground surface 102 and to raise or lower the frame 104 with respect to the ground surface 102. Each of the first, second, third and fourth legs 120A, 120B, 120C, 120D may be independently actuated by the hydraulic system 107 to raise or lower the frame 104 with respect to the ground surface 102.

In other embodiments, each of the first, second, third and fourth ground engaging members 112A, 112B, 116A, 116B may be coupled to the frame 104 by a height adjustable linkage mechanism. Furthermore, each of the height adjustable linkage mechanisms may be configured to raise or lower a corresponding ground engaging member 112A, 112B, 116A, 116B relative to the frame 104. One or more level sensors may be disposed on the milling machine 100 to determine a slope or stability measurement of the milling machine 100 with reference to the ground surface 102. Further, the one or more level sensors may be configured to determine positions of the ground engaging members 112A, 112B, 116A, 116B with reference to the frame 104 of the milling machine 100. The height adjustable linkage mechanism may be actuated by the hydraulic system 107. Alternatively, the height adjustable linkage mechanism may be actuated by the hydraulic system 107 in combination with an electric system of the milling machine 100. The height adjustable linkage mechanism may be selectively actuated to raise or lower the first, second, third and fourth ground engaging members 112A, 112B, 116A, 116B individually.

The milling machine 100 further includes a rotor housing 124 attached to the frame 104. In the illustrated embodiment, the rotor housing 124 is attached to the frame 104 between the first and second set of ground engaging members 112, 116. In other embodiments, the rotor housing 124 may be disposed adjacent to the rear end 118 of the milling machine 100. A rotor 125 is rotatably disposed within the rotor housing 124 and operably coupled to the engine 106 by a drive train (not shown). The rotor 125 may be configured to engage with the ground surface 102 to perform milling operation, such as soil removal, surface reclamation, and the like on the ground surface 102. The conveyor system 111 is disposed adjacent to the front end 114 of the milling machine 100 and coupled with the rotor housing 124 to receive the material removed from the ground surface 102.

The milling machine 100 further includes a system 130 for controlling slope or stability of the milling machine 100 with respect to the ground surface 102. The system 130 is disposed in the milling machine 100 to control the stability thereof during travel of the milling machine 100 over the ground surface 102 and milling operation of the milling machine 100. The system 130 controls the slope of the milling machine 100 during operation and movement.

The system 130 includes a sensing unit 132 disposed on the frame 104. The sensing unit 132 is configured to generate a signal indicative of the slope of the milling machine 100. The slope of the milling machine 100 may be defined with respect to a movement of the milling machine 100 about a longitudinal axis IA' (shown in FIG. 2) and a transverse axis 'TA' (shown in FIG. 3) thereof. The longitudinal axis IA' may extend across a length of the milling machine 100 and the transverse axis 'TA' may extend across a width of the milling machine 100. The slope of the milling machine 100 is further defined with respect to a movement of the milling machine 100 and with respect to a horizontal plane 'P' perpendicular to a direction of a gravitational force 'F' of the milling machine 100. The gravitational force 'F' may correspond to a force caused by a weight of the milling machine 100 at a center of gravity 'CG' thereof towards the ground surface 102. The horizontal plane 'P' is hereinafter referred to as the reference plane 'P'.

In the illustrated embodiment, the sensing unit 132 is located on the frame 104 between the first set of ground engaging members 112 and the second set of ground engaging members 116. Furthermore, the sensing unit 132 may be centered on the frame 104 between the first and second set of ground engaging members 112, 116. In another embodiment, the sensing unit 132 may be disposed on the frame 104 around an intersecting location defined by the longitudinal axis 'LA' and the transverse axis 'TA' of the milling machine 100. In other embodiments, the sensing unit 132 may be disposed at any location in the frame 104 to generate the signal indicative of the slope of the milling machine 100. In yet another embodiment, a plurality of the sensing units 132 may be disposed at various locations in the frame 104 of the milling machine 100.

In an example, the sensing unit 132 may include a gyro sensor. The gyro sensor may be configured to generate signals indicative of rotational attributes of the milling machine 100, such as a pitch and a roll. The pitch may correspond to the movement of the milling machine 100 about the transverse axis 'TA' and the roll may correspond to the movement of the milling machine 100 about the longitudinal axis 'LA'. In various examples, the sensing unit 132 may include a sensor device, an angle measurement device, a force balancing member, a solid state member, a fluid filled device, an accelerometer, a tilt switch or any other device that can determine the slope of the milling machine 100 with respect to one or more of the various reference parameters including, but not limited to, the longitudinal axis 'LA' and the transverse axis 'TA' of the milling machine 100, the reference plane 'P' and the ground surface 102.

The system 130 further includes a level sensor 133 disposed on the frame 104 of the milling machine 100. It may be contemplated that the level sensor 133 may be disposed at any location in the milling machine 100. The level sensor 133 is configured to generate a signal indicative of a slope or stability of the milling machine 100 with reference to the ground surface 102. The slope of the milling machine 100 with reference to the ground surface 102 may be defined based on the reference plane 'P' of the milling machine 100.

The system 130 further includes a controller 134 in communication with the sensing unit 132. The controller 134 is configured to receive the signal indicative of the slope of the milling machine 100 about the longitudinal axis 'LA' and the transverse axis 'TA' thereof generated by the sensing unit 132. The controller 134 further communicates with the level sensor 133 to receive the signal generated by the level sensor 133. The controller 134 is disposed within the operator cab 108. However, in other embodiments, the controller 134 may be disposed at any location in the frame 104. The controller 134 may include a memory module 136 (shown in FIG. 4) for storing various input and output data. The controller 134 may further include an operator interface (not shown) such that an operator may provide input data to the controller 134 and retrieve output data from the controller 134 through the operator interface. The operator interface may include various control buttons, switches, display, and the like.

The controller 134 is further configured to be in communication with the hydraulic system 107. In an example, the hydraulic system 107 may include a reservoir for containing a hydraulic fluid and one or more pumps to communicate the hydraulic fluid with the ground engaging member 110 and the legs 120. One or more direction control valves may be disposed in the hydraulic system 107 to control direction of flow of the hydraulic fluid. Furthermore, additional control valves, such as check valves, pressure relief valves, pressure regulating valves, and the like may be disposed in the hydraulic system 107 for generating required hydraulic power for actuation of the ground engaging members 110 and the legs 120. The controller 134 may be communicated with the one or more directional control valves and one or more additional control valves to control the flow of the hydraulic fluid to each of the first, second, third and fourth ground engaging members 112A, 112B, 116A, 116B and the first, second, third and fourth legs 120A, 120B, 120C, 120D. Thus the hydraulic system 107 in communication with the controller 134 is configured to actuate each of the first, second, third and fourth ground engaging members 112A, 112B, 116A, 116B and the first, second, third and fourth legs 120A, 120B, 120C, 120D individually based on an input received from the controller 134.

Figure 2:
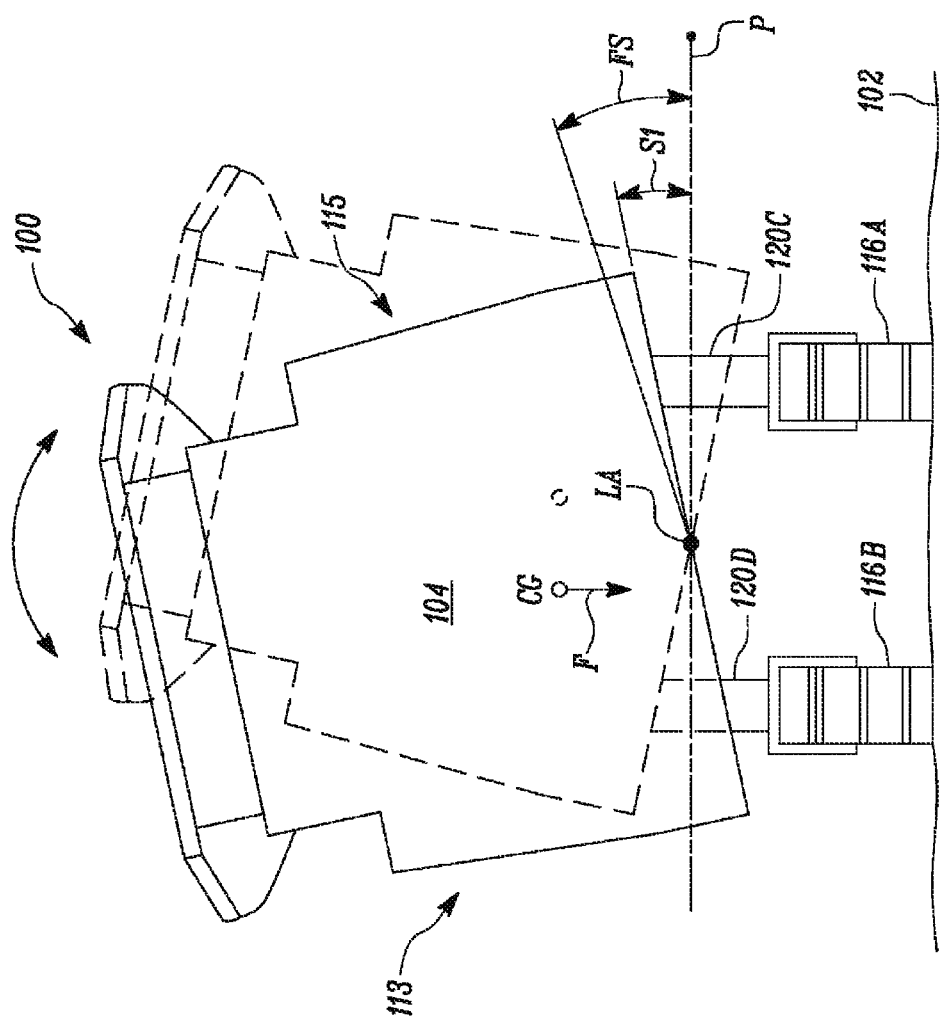
FIG. 2 is a schematic rear view of the milling machine showing a movement thereof about a longitudinal axis.
Figure 3:
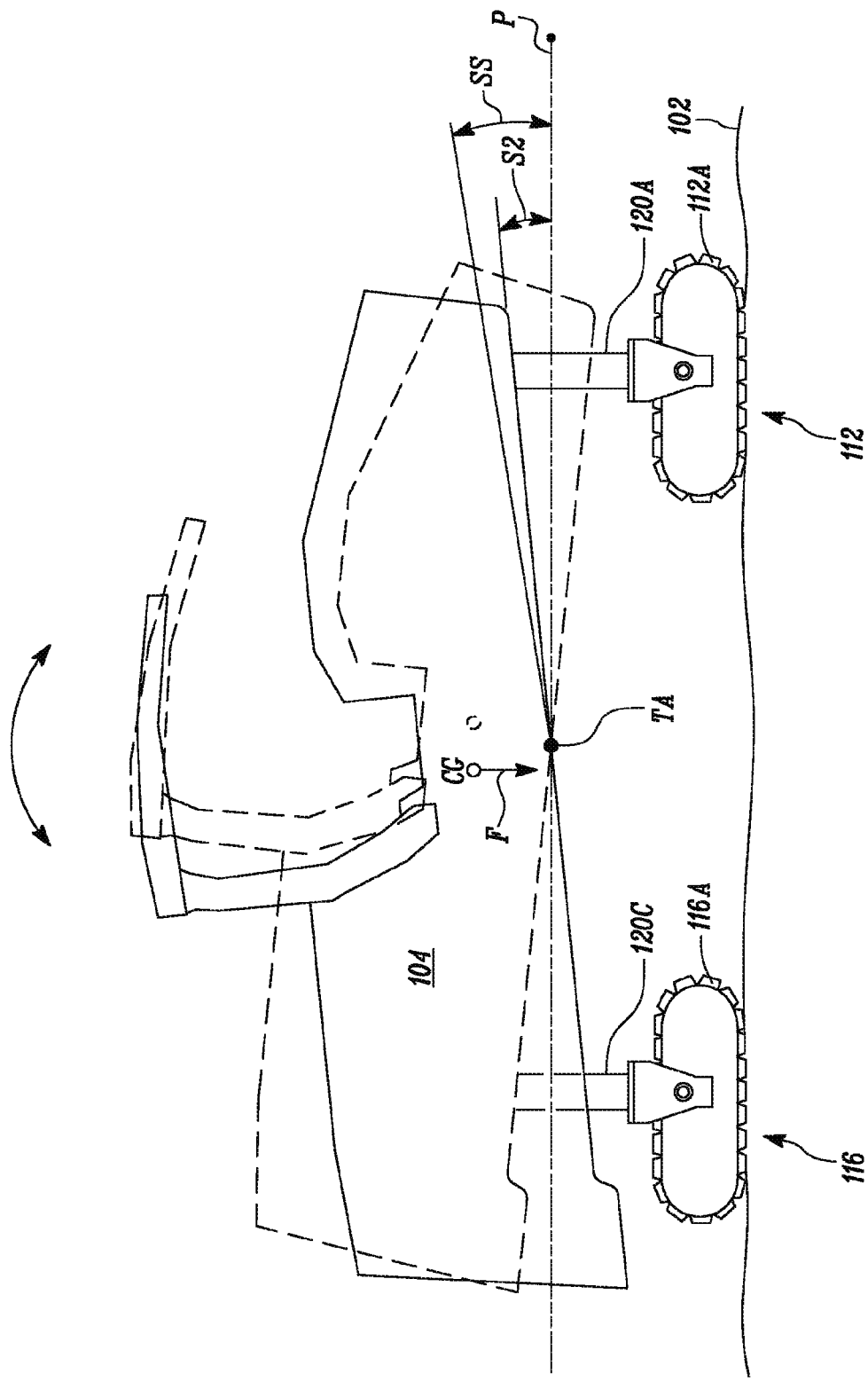
FIG. 3 is a schematic side view of the milling machine showing a movement thereof about a transverse axis.
Figure 4:
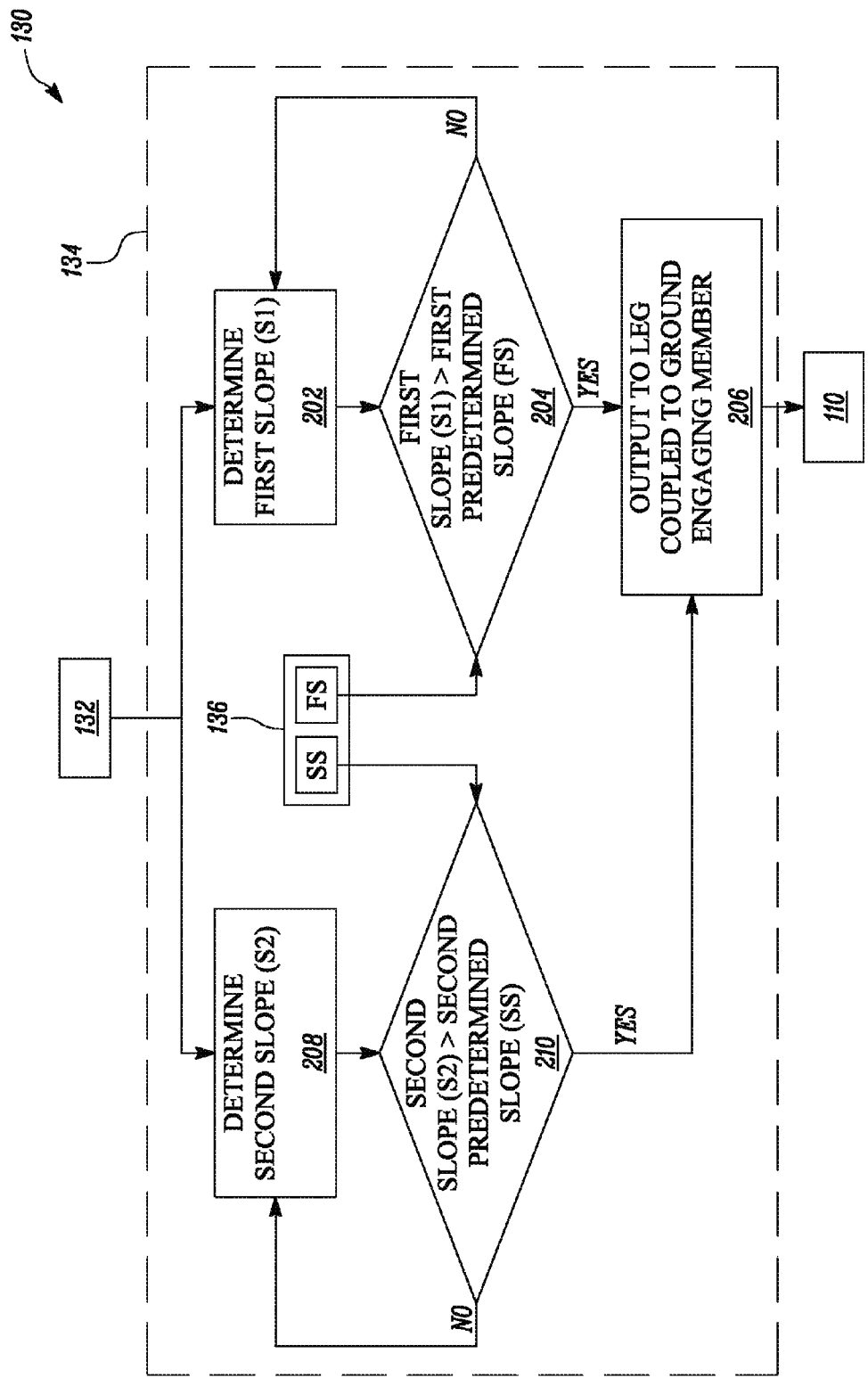
FIG. 4 is a block diagram of a system used for controlling stability of the milling machine, according to an embodiment of the present disclosure.

FIG. 4 illustrates a block diagram of the system 130 configured to control the slope or stability of the milling machine 100. Referring to FIGS. 2 to 4, at block 202, the controller 134 is configured to determine a first slope 'S1' of the milling machine 100 based on the signal received from the sensing unit 132. The first slope 'S1' is a first angle defined by the longitudinal axis 'LA' of the milling machine 100. The first slope 'S1' is further defined with reference to the reference plane 'P' perpendicular to the gravitational force 'F' of the milling machine 100. The controller 134 in communication with the sensing unit 132 may receive a signal corresponding to the movement of the milling machine 100 about the longitudinal axis IA' thereof to determine the first slope 'S1'. In various embodiments, the controller 134 may determine the first slope 'S1' based on the reference parameters including the movement of the milling machine 100 about the longitudinal axis 'LA', the reference plane 'P' and the ground surface 102.

At block 204, the controller 134 is configured to compare the first slope 'S1' with a first predetermined slope 'FS'. The controller 134 may check whether the first slope 'S1' is greater than or equal to the first predetermined slope 'FS'. The first predetermined slope 'FS' may correspond to a maximum value of the first angle. In an exemplary embodiment, the maximum value of the first angle may be 15 degree. In various examples, the maximum value of the first angular position may vary based on specification of the milling machine 100, such as an overall length, a wheel base, an overall height and a weight of the milling machine 100. The first predetermined slope 'FS' may be stored in the memory module 136 of the controller 134 or set by the operator. Further, the first predetermined slope 'FS' may be derived from a predefined look-up table or a graphical representation.

At block 206, the controller 134 is configured to actuate at least one of the legs 120 to raise or lower the ground engaging member 110 if the first slope 'S1' is greater than or equal to the first predetermined slope 'FS'. If the first slope 'S1' is greater than the first predetermined slope 'FS', then the controller 134 communicates with the hydraulic system 107 to extend or retract at least one of the first, second, third and fourth vertically adjustable legs 120A, 120B, 120C, 120D to reduce the first slope 'S1' less than the first predetermined setpoint or slope 'FS'. The selected legs to be actuated may be referred to as the actuatable leg. The controller 134 actuates at least one of the legs 120 until the first slope 'S1' is reduced to at or below the first predetermined slope 'FS'. The controller may also be configured to actuate at least one of the legs 120 until the first slope 'S1' is reduced to at or below a third predetermined slope. The third predetermined slope is less than or equal to the first predetermined slope 'FS'. The third predetermined slope may further correspond to an angle of the frame 104, which is less than the first angle, with reference to the reference plane 'P'.

In an embodiment, the controller 134 determines the slope of the milling machine 100 with reference to the ground surface 102 based on the signal received from the level sensor 133. The controller 134 may determine the slope of the milling machine 100 about the longitudinal axis 'LA' and the transverse axis 'TA'. The controller 134 further determines positions of the legs 120 with reference to the frame 104. The position of each of the legs 120 may correspond to a position between the maximum extended position and the maximum retracted position thereof. Each of the legs 120 may be at various positions based on the slope of the milling machine 100. In an example, one or more of the legs 120 may be at the extended position or the retracted position, or between the extended position and the retracted position. The controller 134 may determine the positions of the legs 120 based on the signal received from the level sensor 133. The controller 134 may also communicate with the hydraulic system 107 to determine the position of the legs 120. The controller 134 further actuates the legs 120 based on the positions of the legs 120 and the first slope 'S1' of the milling machine 100. In one example, if the first leg 120A is in the extended position, then the first leg 120A may not extend further to control the first slope 'S1'. Similarly, if the second leg 120B is in the retracted position, then the second leg 120B may not retract further to control the first slope 'S1'. Thus, the controller 134 actuates at least one of the first, second, third and fourth legs 120A, 120B, 120C, 120D based on the positions of each of the legs 120 to control the first slope 'S1'.

In another embodiment, the controller 134 may be configured to determine the first slope 'S1' of the milling machine 100 with reference to a first side 113 thereof. As shown in FIG. 2, the first slope 'S1' may correspond to the first angle due to a movement of the milling machine 100 towards the first side 113 thereof about the longitudinal axis 'LA'. If the first slope 'S1' determined along first side 113 of the milling machine 100 is greater than the first predetermined slope 'FS', then the controller 134 may be configured to raise at least one of the legs 120 disposed adjacent to the first side 113 of the milling machine 100. In an example, referring to FIG. 2, the controller 134 may communicate with the hydraulic system 107 to actuate the fourth leg 120D such that the piston body 121 may move to the extended position thereof.

In another embodiment, at block 208, the controller 134 is configured to determine a second slope 'S2' of the milling machine 100 based on the signal received from the sensing unit 132. The second slope 'S2' is a second angle defined by the transverse axis 'TA' of the milling machine 100. The second slope 'S2' is further defined with reference to the reference plane 'P' perpendicular to the gravitational force 'F' of the milling machine 100. The controller 134 may receive a signal corresponding to the movement of the milling machine 100 about the transverse axis 'TA' to determine the second slope 'S2'.

At block 210, the controller 134 is further configured to compare the second slope 'S2' with a second predetermined slope 'SS'. The controller 134 may check whether the second slope 'S2' is greater than or equal to the second predetermined slope 'SS'. The second predetermined slope 'SS' may correspond to a maximum value of the second angle defined about the transverse axis 'TA'. In an example, the maximum value of the second angle may be 30 degree. The second predetermined slope 'SS' may be stored in the memory module 136.

The controller 134 is further configured to actuate at least one of the legs 120 to raise or lower the ground engaging member 110 if the second slope 'S2' is greater than the second predetermined slope 'SS'. If the second slope 'S2' is greater than or equal to the second predetermined slope 'SS', then the controller 134 selects an actuatable leg from the first, second, third and fourth legs 120A, 120B, 120C, 120D and communicates with the hydraulic system 107 to raise or lower the actuatable to reduce the second slope 'S2' less than or equal to the second predetermined slope or setpoint 'SS'. The controller 134 actuates at least one of the legs 120 until the second slope 'S2' is reduced to at or below the second predetermined slope 'SS'.

In another embodiment of the present disclosure, the controller 134 may be configured to determine a cross slope of the rotor 125. One or more angle sensors (not shown) may be disposed in the rotor housing 124 to generate a signal indicative of the cross slope of the milling machine 100. The one or more angle sensors may also be disposed at any location in the milling machine 100 to generate the signal indicative of the cross slope of the rotor 125. The controller 134 may be communicated with the one or more angle sensors to determine the cross slope based on the signal received from the one or more angle sensors. The controller 134 may further communicate with the hydraulic system 107 to actuate at least one of the first, second, third and fourth legs 120A, 120B, 120C, 120D based at least in part on the cross slope meeting or exceed a predetermined cross slope threshold setpoint and to stop actuation when the cross sleep is at or lower than another predetermined setpoint (which may be equal to the predetermined cross slope threshold setpoint). The hydraulic system 107 may be actuated to control an angular position of the rotor 125 with reference to the ground surface 102. Based on the angular position of the rotor 125, the controller 134 may communicate with the hydraulic system 107 to actuate the leg 120. In an example, the rotor housing 124 may be coupled to one or more hydraulic actuators. The one or more hydraulic actuators may be communicated with the hydraulic system 107 to control the angular position of the rotor 125. Thus, the controller 134 may control the stability of the milling machine 100 based on inputs, such as the first slope 'S1', the second slope 'S2' and the cross slope of the rotor 125.

INDUSTRIAL APPLICABILITY

The present disclosure relates to the system 130 and a method 300 for controlling the slope of the milling machine 100. The sensing unit 132 generates the signal indicative of the slope of the milling machine 100 during the travel and/or the milling operation thereof. The controller 134 in communication with the sensing unit 132 determines the first and second slopes 'S1', 'S2' based on the signal and compares the first and second slopes 'S1', 'S2' with the first and second predetermined slopes 'FS', 'SS', respectively. If at least one of the first and second slopes 'S1', 'S2' is greater than or equal to the first and second predetermined slopes 'FS', 'SS', respectively, then the controller 134 communicates with the hydraulic system 107 to actuate at least one of the first, second, third and fourth legs 120A, 120B, 120C, 120D to raise or lower the first, second, third and fourth ground engaging members 112A, 112B, 116A, 116B, respectively, to control the stability of the milling machine 100.

Figure 5:
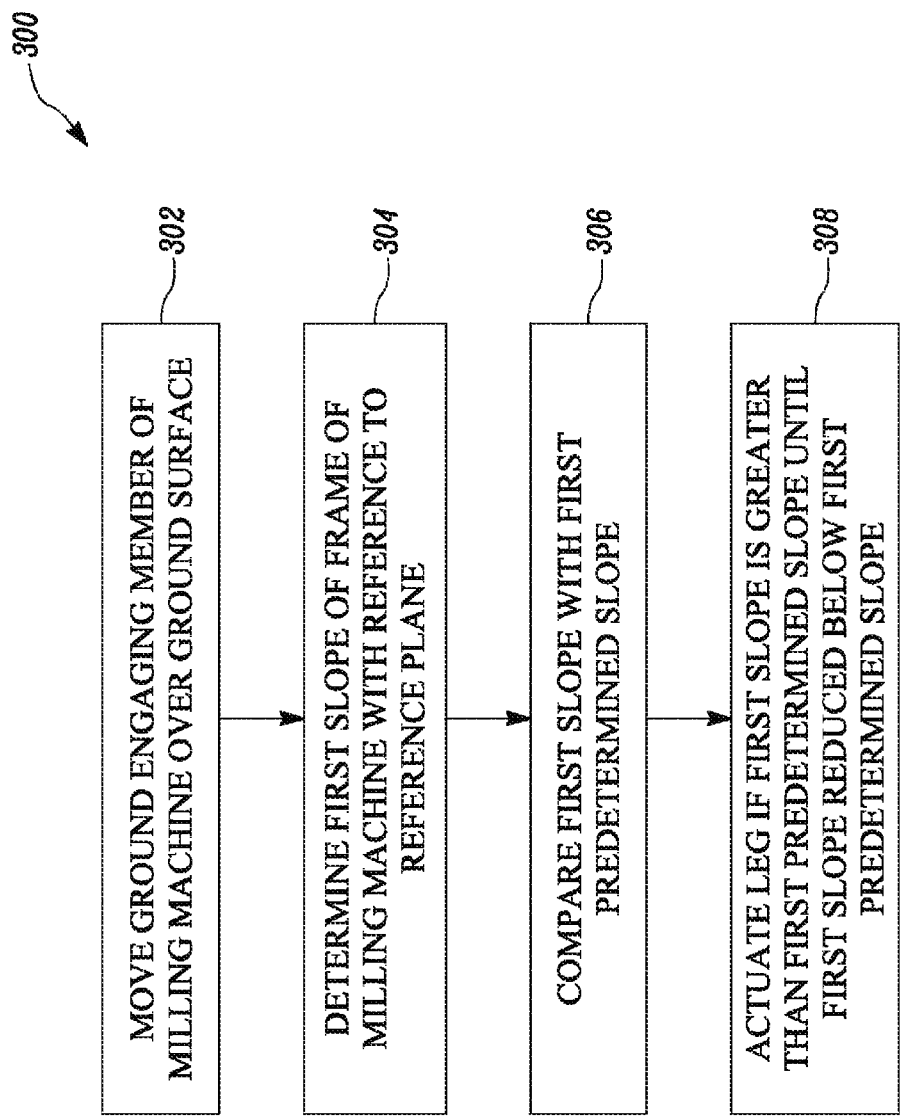
FIG. 5 is a flowchart of a method of controlling the stability of the milling machine, according to an embodiment of the present disclosure.

FIG. 5 illustrates a flowchart of the method 300 of controlling the slope of the milling machine 100, according to an embodiment of the present disclosure. At step 302, the method 300 includes moving the ground engaging member 110 over the ground surface 102. The operator may provide input through the operator interface to move the milling machine 100 over the ground surface 102. Movement of the milling machine 100 may vary based on the milling operation and terrain of the ground surface 102. The milling machine 100 may incline with reference to the ground surface 102 during the movement based on a terrain of the ground surface 102. At step 304, the method 300 includes determining the first slope 'S1' of the milling machine 100 with reference to the reference plane 'P'. The method 300 further includes determining the second slope 'S2' of the milling machine 100. The sensing unit 132 disposed on the frame 104 generates the signal indicative of the first slope 'S1' and the second slope 'S2' of the milling machine 100 about the longitudinal axis 'LA' and the transverse axis 'TA'. The controller 134 in communication with the sensing unit 132 determines the first slope 'S1' and the second slope 'S2' based on the received signal. In an embodiment, the controller 134 may be configured to determine a rate of change of the first slope 'S1' and the second slope 'S2' based on the movement of the milling machine 100 about the longitudinal axis 'LA' and the transverse axis 'TA'.

At step 306, the method 300 includes comparing the first slope 'S1' with the first predetermined slope 'FS'. The method 300 further includes comparing the second slope 'S2' with the second predetermined slope 'SS'. The controller 134 check whether the first and second slopes 'S1', 'S2' are greater than or equal to the first and second predetermined slopes 'FS', 'SS', respectively, stored in the memory module 136 of the controller 134. The first and second predetermined slopes 'FS', 'SS' are stored in the memory module 136 before the operator moves the milling machine 100 over the ground surface 102.

At step 308, the method 300 includes actuating at least one of the legs 120 to raise or lower the ground engaging member 110 if the first slope 'S1' is greater than the first predetermined slope 'FS'. The method 300 further includes actuating at least one of the legs 120 to raise or lower the ground engaging member 110 if the second slope 'S2' is greater than the second predetermined slope 'SS'. At least one of the legs 120 is actuated until the first slope 'S1' is reduced to at or below the first predetermined slope 'FS' and the second slope 'S2' is reduced to at or below the second predetermined slope 'SS'. The controller 134 in communication with the hydraulic system 107 controls flow of the hydraulic fluid to the first, second, third and fourth legs 120A, 120B, 120C, 120D to raise or lower the corresponding ground engaging member 112A, 112B, 116A, 116B relative to the frame 104. The controller 134 may actuate the hydraulic system 107, if at least one of the first and second slopes 'S1', 'S2' is greater than or equal to the first and second predetermined slopes 'FS', 'SS', respectively. Thus, the first and second slopes 'S1', 'S2' of the milling machine 100 may be controlled within the first and second predetermined setpoints or slopes 'FS', 'SS' during movement of the milling machine 100.

The method 300 also includes determining the slope of the milling machine 100 with reference to the ground surface 102 based on the signal received from the level sensor 133. Further, position of each of the legs 120 with reference to the frame 104 is determined based on the signal received from the level sensor 133. Further, at least one of the legs 120 is actuated based on the positions of the legs 120 and the first slope 'S1' of the milling machine 100. More particularly, at least one of the first, second, third and fourth legs 120A, 120B, 120C, 120D is actuated to raise or lower the first, second, third and fourth ground engaging members 112A, 112B, 116A, 116B, respectively, based on the positions of each of the legs 120 to control the first slope 'S1'.

With the present disclosure, the system 130 controls the slope of the milling machine 100 during movement thereof without the need of manual operation or intervention. Thus, the operator may concentrate on controlling other operating parameters of the milling machine 100 as the stability of the milling machine 100 during the movement thereof is controlled by the system 130. In a machine that is controlled in an autonomous mode, certain functions of the controller 134 may be performed from a remote center to control slope of the machine.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for controlling a stability of a milling machine, the system comprising:
   a frame;
   a plurality of legs extending between the frame and a ground surface, each leg of the plurality of legs being configured to extend and retract along a length thereof with respect to the frame; and
   a controller configured to:
      determine a first slope of the frame, the first slope being indicative of an inclination of the milling machine with respect to the ground surface; and
      actuate one or more legs of the plurality of legs to decrease the inclination of the milling machine based on a comparison of the first slope to a first predetermined slope, wherein the first predetermined slope is indicative of a stability limit of the milling machine.

2. The system of claim 1, wherein the controller is configured to actuate the one or more legs if the first slope is greater than or equal to the first predetermined slope.

3. The system of claim 1, wherein the first predetermined slope is a function of at least one of a length, a wheel base, a height, and a weight of the milling machine.

4. The system of claim 1, wherein the first slope is further indicative of the inclination of the milling machine with reference to a longitudinal axis of the milling machine, and wherein the controller is further configured to:
   determine a second slope, wherein the second slope is indicative of the inclination of the milling machine with reference to a transverse axis of the milling machine; and
   actuate one or more legs of the plurality of legs if the second slope is greater than or equal to a second predetermined slope, wherein the second predetermined slope is indicative of a stability limit of the milling machine with reference to the transverse axis.

5. The system of claim 2, wherein the first predetermined slope is fifteen degrees.

6. The system of claim 1, wherein the controller is configured to actuate one or more legs of the plurality of legs until the first slope is reduced to a third predetermined slope, and wherein the third predetermined slope is less than or equal to the first predetermined slope.

7. The system of claim 1, wherein the controller is further configured to:
   determine a height of each leg of the plurality of the legs; and
   actuate at least one leg of the plurality of the legs based on the determined height and the first slope.

8. A milling machine comprising:
   a frame;
   a rotor coupled to the frame; and
   a first length adjustable leg coupled to the frame;
   a second length adjustable leg coupled to the frame;
   a third length adjustable leg coupled to the frame;
   a fourth length adjustable leg coupled to the frame; and
   a controller configured to:
      determine an inclination of the frame with respect to a ground surface; and
      actuate an actuatable leg to decrease the inclination based on a comparison of the determined inclination to a predetermined stability limit of the milling machine, wherein the actuatable leg is at least one of the first length adjustable leg, the second length adjustable leg, the third length adjustable leg, and the fourth length adjustable leg.

9. The milling machine of claim 8, wherein the controller is configured to actuate the actuatable leg when the determined inclination is greater than or equal to the predetermined stability limit, and the controller is further configured to:
stop actuation of the actuatable leg when the determined inclination is less than or equal to the predetermined stability limit.

10. The milling machine of claim 9, wherein the controller is further configured to:
determine a first height of the first length adjustable leg;
determine a second height of the second length adjustable leg;
determine a third height of the third length adjustable leg; and
determine a fourth height of the fourth length adjustable leg.

11. The milling machine of claim 10, wherein the controller is further configured to:
determine the actuatable leg based on the first height, the second height, the third height, the fourth height, and the determined inclination.

12. The milling machine of claim 11, wherein the determined inclination is a first inclination of the frame along a longitudinal axis of the milling machine and the predetermined stability limit is the stability limit of the milling machine along the longitudinal axis, and the controller is further configured to:
determine a second inclination, wherein the second inclination is an inclination of the frame with respect to the ground surface along a transverse axis of the milling machine; and
actuate a second actuatable leg when the second inclination is greater than or equal to a second predetermined stability limit, wherein the second actuatable leg is at least one of the first length adjustable leg, the second length adjustable leg, the third length adjustable leg, and the fourth length adjustable leg, and wherein the second predetermined stability limit is the stability limit of the milling machine along the transverse axis.

13. The milling machine of claim 12, wherein the controller is further configured to:
determine the second actuatable leg based on the first height, the second height, the third height, the fourth height, and the second inclination.

14. The milling machine of claim 8, wherein the predetermined stability limit is a function of a size of the milling machine.

15. The milling machine of claim 8, wherein the predetermined stability limit is a function of at least one of a length, a wheel base, a height, and a weight of the milling machine.

16. The milling machine of claim 8, wherein the predetermined stability limit is fifteen degrees.

17. A method of controlling a stability of a milling machine comprising:
moving a ground engaging member of the milling machine over a ground surface, wherein the ground engaging member is coupled to a frame of the milling machine by a leg;
determining a first slope of the frame, wherein the first slope is indicative of an inclination of the milling machine with respect to the ground surface; and
actuating the leg to decrease the inclination of the milling machine based on a comparison of the first slope to a first predetermined slope, wherein the first predetermined slope is indicative of a stability limit of the milling machine and is a function of a size of the milling machine.

18. The method of claim 17, wherein the first slope is indicative of the inclination of the milling machine along a longitudinal axis of the milling machine and the first predetermined slope is indicative of a stability limit of the milling machine along the longitudinal axis, the method further comprising:
determining a second slope of the frame, wherein the second slope is indicative of the inclination of the milling machine along a transverse axis of the milling machine; and
actuating the leg if the second slope is greater than or equal to a second predetermined slope, wherein the second predetermined slope is indicative of a stability limit of the milling machine along the transverse axis.

19. The method of claim 17, wherein the first predetermined stability limit is a function of at least one of a length, a wheel base, a height, and a weight of the milling machine.

20. The method of claim 17, further including determining the first predetermined stability limit from a lookup table.

* * * * *